United States Patent [19]

Schlueter, Jr. et al.

[11] Patent Number: 5,259,989
[45] Date of Patent: Nov. 9, 1993

[54] ELECTRICALLY CONDUCTIVE ELASTOMER

[75] Inventors: Edward L. Schlueter, Jr.; Henry L. Manuel, both of Rochester; James F. Smith, Ontario; Thomas C. Parker, Webster; Robert M. Ferguson, Penfield, all of N.Y.

[73] Assignee: Xerox Corporation, Stamford, Conn.

[21] Appl. No.: 37,144

[22] Filed: Mar. 25, 1993

[51] Int. Cl.$^5$ ............................................. H01B 1/00
[52] U.S. Cl. .................................. 252/500; 428/36.9; 428/423.1; 428/425.8; 528/52; 528/56
[58] Field of Search ...................... 252/500; 528/52, 56

[56] References Cited

U.S. PATENT DOCUMENTS

| | | |
|---|---|---|
| 3,959,573 | 5/1976 | Eddy et al. .................. 428/425 |
| 3,959,574 | 5/1976 | Seanor et al. ................ 428/425 |
| 4,058,879 | 11/1977 | Lentz et al. .................. 526/342 |
| 4,062,812 | 12/1977 | Safford et al. ............... 428/424.7 |
| 4,116,894 | 9/1978 | Lentz et al. .................. 521/94 |

Primary Examiner—Morton Foelak

[57] ABSTRACT

An electrically conductive polyurethane elastomer obtained by the reaction of a polytetramethylene ether glycol having the formula $HO[(CH_2)_4O]_xH$ where x is from 8 to 41 and from about 20 to about 95 parts by weight per 100 parts by weight of said glycol of at least one diisocyanate, a sufficient amount of chain extender and cross linking agents to provide a crosslinked elastomer and an amount of an asymmetric ionic quarternary ammonium salt having the formula:

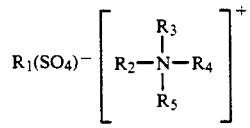

where $R_1$, $R_2$, $R_3$, $R_4$ and $R_5$ are $C_nH_{2n+1}$ and $1 \leq n \leq 25$ sufficient to provide a D.C. volume resistivity of from about $10^7$ to about $10^{11}$ ohm cm. In a preferred embodiment the asymmetric ionic quarternary ammonium salt is hexadecyl ethyl dimethyl ammonium ethyl sulfate.

15 Claims, 1 Drawing Sheet

ELECTRICALLY CONDUCTIVE ELASTOMER

CROSS REFERENCE TO RELATED APPLICATION

Attention is directed to U.S. application Ser. No. 08/037,145 entitled "Electrically Conductive Polyurethane Elastomer" in the name of Schlueter, et al., filed concurrently herewith.

BACKGROUND OF THE INVENTION

The present invention relates to an electrically conductive polyurethane elastomer and in particular to asymmetric ionic quarternary ammonium salts to extend the electrical life of polyurethane elastomers. It has particular application in electrostatographic printing apparatus and in particular as a biased transfer member in transferring toner from an electrostatographic imaging surface to a receiving surface such as a sheet of paper.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attracted from the carrier granules of the developer material onto the latent image. The resultant toner powder image is then transferred from the photoconductive surface to a sheet of support material and permanently affixed thereto.

This process is well known and useful for light lens copying from an original and in printing applications from electronically generated or stored originals.

In a reproduction process of the type as described above, it is common practice today to use a biased transfer member to transfer the developed image from the photoconductor to the final support material such as a sheet of paper. Typically, these biased transfer members take the form of a roll and are comprised of a polyester based polyurethane with an additive to control resistivity such as tetraheptyl ammonium bromide. While capable of performing satisfactorily as a bias transfer member, in a transfer system wherein only about 25 microamps are applied to the transfer member difficulties are experienced in other systems, particularly, in multicolor imaging systems where more than one toner and a greater pile height of toner on the photoconductor must be transferred to the copy sheet. These systems require additional current up to 75 microamps. While the polyester based polyurethanes containing a tetraheptyl ammonium bromide operate satisfactorily at low current loads (25 microamps) having an electrical life of up to 1,500,000 prints at these increased current loads (75 microamps) we have found that the electrical life is shortened to approximately 500,000 prints. This is believed to be due to the depletion of the conductive additive in the polyurethane, in that the ionic components want to separate and over time the conductive additive is depleted, the resistance of the transfer member increases and under constant current the voltage on the power supply maximizes leading to a transfer system failure. This is believed to be due to the fact that the present systems are very low crosslinked systems and therefore the additives have high mobility and are very easily transported through the elastomer network, resulting in the diffusion of the charged components and accordingly reduction in conductivity of the transfer member. These prior art systems are described in U.S. Pat. No. 3,959,574 to Seanor et al. and U.S. Pat. No. 3,959,573 to Eddy et al.

Furthermore, attempts to use a new polyether based polyurethane exhibiting high wear resistance and low compression set as described in commonly assigned copending application Ser. No. 07/767,442 entitled "High Wear Resistance Low Compression Set Polyurethane" filed Sept. 30, 1991, in the name of Schlueter et al. as a biasable member with the tetraheptyl ammonium bromide additive met with failure in that the tetraheptyl ammonium bromide poisoned the catalyst so that the degree of cross linking was inadequate.

SUMMARY OF THE INVENTION

In accordance with a principle aspect of the present invention an electrically conductive polyurethane elastomer having an extended electrical life is provided. More specifically, a polyether based polyurethane contains an asymmetric ionic quarternary ammonium salt which will extend it's useful electrical life. It is believed that by providing a very asymmetric additive as well as a highly cross linked elastomer that the mobility of the additive through the polymer network of the elastomer is reduced and accordingly the useful life of the conductive additive extended. The use of a very asymmetric conductive additive is in sharp contrast to the symmetrical tetraheptyl ammonium bromide used in the above referenced prior art systems.

In a further aspect of the present invention an electrically conductive polyurethane elastomer is obtained by the reaction of a polytetramethylene ether glycol having the formula $HO[(CH_2)_4O]_xH$ where x is from 8 to 41 and from about 20 to about 95 parts by weight per 100 parts by weight of the glycol of at least one diisocyanate, a sufficient amount of chain extenders and cross linking agents to provide a crosslinked elastomer and an amount of an asymmetric ionic quarternary ammonium salt having the formula:

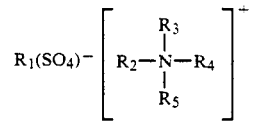

where $R_1$, $R_2$, $R_3$, $R_4$ and $R_5$ are $C_nH_{2n+1}$ and $1 \leq n \leq 25$ to provide a D.C. volume resistivity of from about $10^7$ to about $10^{11}$ ohm cm. In a particularly preferred embodiment the quarternary ammonium salt is hexadecyl ethyl dimethyl ammonium ethyl sulfate.

In a further aspect of the present invention the electrically conductive polyurethane elastomer is used as a coating on a conductive substrate to form a member for electrically cooperating with an imaging surface to attract charged toner particles from the support surface toward the member which has a uniform bias potential thereon and is capable of transmitting a bias potential from the substrate to the outer periphery of the coating.

In a further aspect of the present invention the diisocyanate is selected from the group consisting of methylene diisocyanates, diphenylmethane diisocyanates, toluene diisocyanates, naphthalene diisocyanates and blends thereof.

In a further aspect of the present invention the chain extenders and cross linking agents comprise a mixture of from about 90 to 60% by weight of a diol having the formula HO($R_6$) OH where $R_6$ is a straight or branched chain alkyl group having from 2 to 12 carbon atoms and from about 10 to 40% of a triol having the formula: R'—C—[(OH)$_a$(CH$_2$OH)$_b$] where R' is H, CH$_3$ or C$_2$H$_5$, a is 0 or 1, b is 2 or 3 and a+b=3.

In a further aspect of the present invention the quarternary ammonium salt is present in an amount of from about 0.5 parts to 8 parts by weight of the total composition.

In a further aspect of the present invention the elastomer may be prepared by adding all the recited reactant constituents and chain extenders and cross linking agents to a reaction vessel at the same time or a prepolymer may be prepared of the polytetramethylene ether glycol and the diisocyanate followed by the addition of both the chain extenders and cross linking agents to the prepolymer.

In a further aspect of the present invention the total weight of chain extenders and cross linking agents is from about 4 to about 18 parts per 100 parts of polytetramethylene ether glycol.

In a further aspect of the present invention the elastomer is formed from a mixture of a chain extender and a cross linking agent of about 75% by weight of 1,4 butanediol and 25% by weight trimethylolpropane.

In a further aspect of the present invention the elastomer is formed from a mixture of a chain extender and a cross linking agent of from about 60% by weight 1,4 butanediol and 40% by weight trimethylolpropane.

In a further aspect of the present invention x is from 39 to 41.

In a further aspect of the present invention the diisocyanate is present in an amount from about 22 to 26 parts by weight per 100 parts by weight of said glycol.

In a further aspect of the present invention the quarternary ammonium salt is initially combined with the chain extenders and cross linking agents and subsequently added to the prepolymer.

For a better understanding as well as other objects and further features thereof, reference is made to the following drawings and descriptions.

DESCRIPTION OF PREFERRED EMBODIMENT

The electrically conductive polyurethane elastomer, and in particular, the biasable transfer members made therefrom have application in a variety of electrostatographic devices. In particular, the biasable transfer member, such as a roll, is capable of electrically cooperating with an imaging surface to attract charged toner particles from the imaging support surface toward the member since the coating is capable of transmitting a bias potential from the substrate to the outer periphery to thereby attract charged toner particles. By selecting an asymmetric conductive additive the mobility and diffusion of the additive through the elastomer is dramatically reduced so that the resistivity stays relatively stable. As a result a constant current and much slower rate of changing of the resistivity of the transfer member is achieved in general and may provide an electrical life extension of up to six times.

Figure 1:
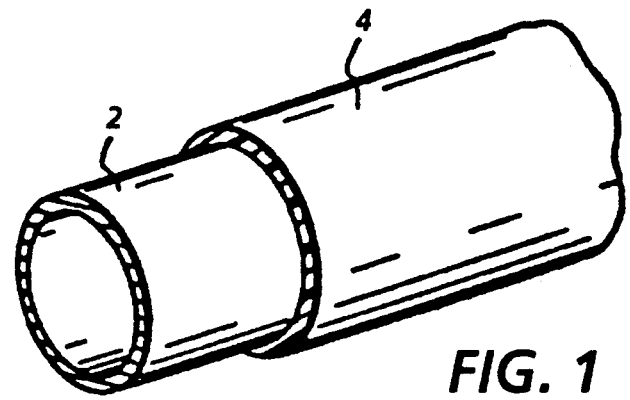
FIG. 1 is a perspective view in partial section showing the construction of a bias transfer roll having an electrically conductive polyurethane elastomer containing an asymmetric ionic quarternary ammonium salt additive coated upon a conductive substrate.

Referring now specifically to FIG. 1, there is shown a cut-away view of a transfer member clearly illustrating the internal construction thereof. The transfer member is in the form of a roll and is basically formed upon a rigid hollow cylinder 2 that is fabricated of a conductive metal, such as aluminum, copper or the like, capable of readily responding to a biasing potential placed thereon. Over core 2 is placed a coating 4 which is an electrically conductive polyurethane elastomer with an additive according to the present invention to render the elastomer conductive and to extend the rolls' useful life. The outer coating 4 which is formed of the resilient elastomeric material is from about 0.001 inch to about 0.250 inch in thickness having a hardness between about 60 Shore A durometer to about 95 Shore A and preferably about 85-95 when the thickness is less than 0.100 inch and 65 to 75 Shore A when the thickness is greater than 0.100 inch. The coating 4 minimizes ionization of the atmosphere in and about the contact region of the bias transfer member with the photoconductor. It is preferred that the resilient elastomeric polyurethane have a D.C. volume resistivity of between about $10^7$ and $5.0 \times 10^{11}$ ohm cm which is reached or controlled by adding the additive to the polyurethane. In accordance with the present invention, the coating of the conductive substrate must be formulated of at least one layer of an elastomeric polyurethane having as an additive, a compound capable of altering the resistivity to within the preferred resistivity range. By coating the biasable transfer member (roll) with the conductive elastomer, according to the present invention, the resistivity of the biasable transfer roll is controlled and the sensitivity of the resistivity of the biasable transfer roll is also controlled in relationship to changes in relative humidity.

Figure 2:
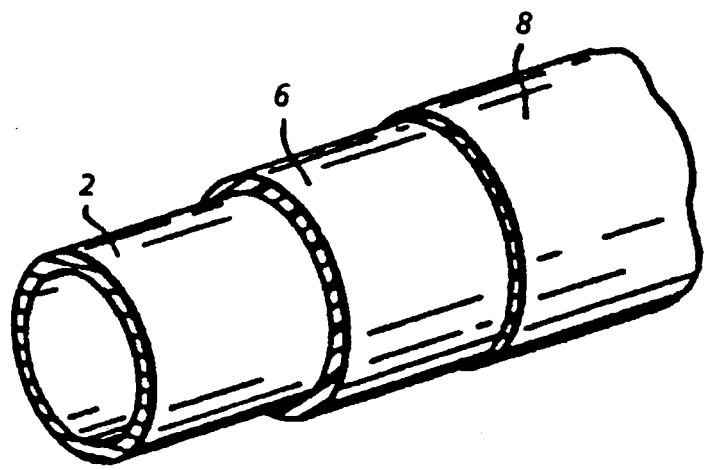
FIG. 2 is a perspective view in partial section showing the construction of a bias transfer roll having an elastomeric resilient blanket or relaxable layer intermediate, the conductive substrate and the electrically conductive polyurethane elastomer with an asymmetric ionic quarternary ammonium salt additive coated thereon.

Referring now to FIG. 2, wherein there is shown a cutaway view of a biasable transfer roll and a clear illustration of the internal construction thereon, there is shown a rigid hollow cylinder 2 that is fabricated of a conductive metal, as in FIG. 1, capable of readily responding to a biasing potential placed thereon. Over the rigid hollow cylinder 2 is placed a relatively thick resilient intermediate blanket 6 of elastomeric polyurethane material having an additive to control the resistivity and having a hardness of between about 60 Shore A and about 95 Shore A. The elastomeric polyurethane may be from about 0.060 to about 0.25 inch in thickness, having sufficient resiliency to allow the roll to deform when brought into moving contact with the photoconductive drum surface to provide an extended contact region in which the toner particles can be transferred between the contacting bodies. At the thinner range of preferred thickness the elastomeric polyurethane layer is relatively hard while at the thicker range of thickness it is relatively soft. Intermediate blanket 6, which is comparable to layer 4 in FIG. 1, should be capable of responding rapidly to the biasing potential to impart electrically the charge potential on the core to the outer extremities of the roll surface. The blanket therefore should have a D.C. volume resistivity of between about $10^7$ and $5.0 \times 10^{11}$ ohm cm, and preferably about $10^9$ to about $10^{10}$ ohm cm. Over the intermediate blanket 6 is placed a relatively thin outer coating 8 which may be an elastomeric material such as a polyurethane having a D.C. volume resistivity of between $10^{10}$ and $10^{15}$ ohm cm and which preferably has a thickness of about 0.001 inch and a hardness of about 85-95 Shore A durometer.

Polyurethane elastomers are typically produced by the reaction of a polyisocyanate and a polyether containing hydroxyl groups according to the general reaction:

$$R_aNCO + R_bOH \rightarrow R_aNHCOOR_b$$

In the practice of the present invention the polyurethane elastomer is made by the reaction of a polytetramethylene ether glycol forming the base polymer chain which has the formula $HO[(CH_2)_4O]_xH$ wherein x is from about 8 to about 41 providing a molecular weight range of the order of from 650 to 2,900. In a preferred embodiment, wherein the overall mechanical properties including resiliency, hardness, compression set as well as toughness are relatively stable over a range of temperature and relative humidity distributions normally encountered in an office environment, x is between 39 and 41. Within this higher range of molecular weights of the glycol a relatively soft segment is provided in the polyurethane elastomer enabling a high level of resiliency over a relatively broad temperature range. The preferred polytetramethylene ether glycols are those having molecular weights near the higher end of the stated range and in particular the polyether glycol Terathane ™ 2900 available from E. I. DuPont de Nemours, Inc. which has a molecular weight of about 2900.

The diisocyanate is selected from the group consisting of methylene diisocyanates, diphenylmethane diisocyanates, toluene diisocyanates, naphthalene diisocyanates and blends thereof and is used in amounts of from about 20 to about 95 parts by weight per 100 parts by weight of the glycol. The functional NCO groups of the diiocyanate provide a relatively hard and rigid segment in the final polymer chain and act very much like a filler to provide a tough but flexible structure that has both hard and soft domains. Typical diisocyanates useful in the practice of the present invention include 4,4' diphenylmethane diisocyanate, 2,4' diphenylmethane diisocyanate, 2,4-toluene diisocyanate, 2,6-toluene diisocyanate and naphthalene 1,5-diisocyanate as well as blends and mixtures thereof. A particularly preferred blend of diisocyanates is one containing 98 percent 4,4' diphenylmethane diisocyanate and 2 percent 2,4' diphenylmethane diisocyanate available under the designation isocyanate ™ 125M from Dow Chemical Company, Midland, Mich.

In a preferred embodiment, with the preferred higher molecular weight glycols, the diisocyanate or blend thereof is present in an amount of from about 22 to 26 parts by weight per 100 parts by weight of the glycol to provide the stoichiometric amount for the reaction to go to completion.

The optimization of the mechanical properties, and in particular, the achievement of high wear resistance with low compression set is attained by the selection of the type and amounts of chain extenders and cross linking agents. Both bifunctional chain extenders and trifunctional cross linking agents are used in the practice of the present invention in a weight ratio of from about 90% to 60%, to 10% to 40% of bifunctional to trifunctional agents with the higher ratio being used with the lower molecular weight glycols. The bifunctional agents have been found to provide a higher toughness, provide more chain extension in that they tend to linearly link the chain thereby providing a long, generally flexible glycol chain interrupted by the rigid isocyanate units. The trifunctional crosslinkers tend to provide two ends of functionality as well as a 90 degree oriented functional member which crosslinks to other chains prohibiting the chains to slide by each other and thereby minimizing the compression set and tensile set properties as well as the mobility of the additive through the elastomer. Accordingly, the appropriate bonds between hard and soft sites in the polyurethane elastomer are obtained by selecting the bifunctional chain extenders and trifunctional cross linking agents in the appropriate ratio. Typically, the bifunctional chain extenders take the formula $HO(R_6)OH$ where $R_6$ is a straight or branched chain alkyl group having from 2 to 12 carbon atoms and the trifunctional cross linking agents are taken from the formula: $R'-C-[(OH)_a(CH_2OH)_b]$ where $R'$ is H, $CH_3$ or $C_2H_5$, a is 0 or 1, b is 2 or 3 and $a+b=3$. Typical bifunctional diols include ethylene glycol, 1,4 butanediol, 1,3 butanediol 1,6 hexanediol and neopentyl glycol and typical trifunctional triols include trimethylolpropane, trimethylolethane and glycerol. Particularly, preferred bifunctional cross linking agents include 1,4 butanediol, 1,6 hexanediol and 1,3 butanediol because they extend the polymer chain linearly yielding tough wear resistant materials. The particularly preferred trifunctional cross linking agents include trimethylolpropane and trimethylolethane because they cross link the polymer chains at 90° and yield very set resistant networks. The bifunctional butanediol acts as a chain extender to extend the chain in the linear way to provide linear soft sites thereby providing the greatest toughness in the final elastomer. On the other hand, the trifunctional trimethylolpropane provides the best compression set performance because it is trifunctional and provides crosslink exchange sites to tighten up the network, thereby providing a crosslinked, three-dimensional network. An amount of combined agents is used to provide a satisfactorily cross linked elastomer. Typically, the total amount of combined extenders and cross linking agents is from about 4 to about 18 parts per 100 parts of the polytetramethylene ether glycol depending on the molecular weight of the glycol with more agents being used with lower molecular weight glycols. In the preferred embodiment with glycols having high molecular weight of the order 2900 and smaller amounts of the diisocyanate of the order of about 22 to 26 parts by weight per 100 parts of the glycol only about 4 to 6 parts by weight of extenders and cross linking agents is necessary because of the long glycol chain length with limited number of functional groups.

The asymmetric ionic quarternary ammonium salt additive according to the present invention has the formula:

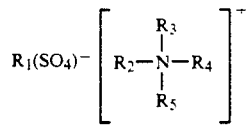

where $R_1$, $R_2$, $R_3$, $R_4$ and $R_5$ are $C_n H_{2n+1}$ and $1 \leq n \leq 25$. While $R_1$, $R_2$, $R_3$, $R_4$, and $R_5$ can be the same it is preferred that they all not be the same but rather that they be as different as possible to cause the greatest asymmetry and therefore low additive mobility leading to the longest electrical life. Typical asymmetric ionic quarternary ammonium salts useful in the practice of the present invention include, among others, Hexadecyl ethyl dimethyl ammonium ethyl sulfate, ($C_{20}H_{44}N.C_2H_5O_4S$); 1-Octadecanaminium, N, N, N-trimethyl-,methyl sulfate ($C_{21}H_{46}N.CH_3O_4S$); 1-Dodecanaminium, N, N, N-trimethyl-, methyl sulfate ($C_{15}H_{34}N.CH_3O_4S$); 1-Heptadecanaminium, N, N, N-trimethyl-, methyl sulfate ($C_{20}H_{44}N.CH_3O_4S$); 1-Tetradecanaminium, N, N, N-trimethyl-, methyl sulfate ($C_{17}H_{38}N.CH_3O_4S$); and 1-Decanaminium, N, N, N-trimethyl-, methyl sulfate ($C_{13}H_{30}N.CH_3O_4S$). Hexadecyl ethyl dimethyl ammonium ethyl sulfate is particularly preferred since it provides an outstanding improvement in electrical life over prior art practices. The salts typically are present in the cured elastomer in an amount sufficient to provide a volume resistivity of from about $10^7$ to about $10^{11}$ ohm cm. Typically, the quarternary ammonium salt is present in an amount of from about 0.5 parts to 8 parts by weight of the total composition: As the amount of conductive additive increases, the resistivity of the elastomer decreases. For the higher molecular weight materials the resistivity is influenced more pronouncely by the increasing addition of conductive additive than for the lower molecular weight materials because they have a greater cross link density with less chain rotation and flexibility. Furthermore, since the elastomer layer can be regarded as a dielectric material in a capacitor as the thickness of the layer increases, the resistivity requirements decrease.

A catalyst is typically used to speed up the rate of reaction of the cross linking and extending mechanisms to provide the cured polyurethane elastomers. Typical conventional catalysts include dibutyl tin dilaurate and stannous octoate in a 1% to 2% solution of the diol extender.

The polyurethane elastomer may be made according to any suitable procedure. For example, all the reactive ingredients including the catalyst may be added at one time or serially to a single reactor vessel to produce the polyurethane elastomer. However, this procedure results in a poorly controlled reaction in that there are two reactions taking place simultaneously; one between the glycol and the diisocyanate and the other between the reaction product of the first reaction and the mixture of extenders and cross linking agents. Thus, formation of a prepolymer, chain extension and cross linking all occur at the same time. Accordingly, it is preferred to prepare a prepolymer of at least a portion of the glycol with at least a portion of the diisocyanate to enable the reaction of the NCO groups of the isocyanate with the OH groups of the glycol to form a long chain so that the NCO groups can't subsequently take up water and retain it in the final polyurethane elastomer presenting an ultimate problem in that it results in unpredictable properties dependent on relative humidity.

For the lower molecular weight glycols, since the curing of the elastomer is exothermic, it is preferred that they only be prepared using the prepolymer method. The prepolymer method provides an initial low molecular weight polymeric diisocyanate and provides better control over the polyurethane formation reaction and eliminates the formation of monomeric diisocyanate. Once the prepolymer, which is typically a viscous liquid, has been formed the mixture of chain extenders and cross linking agents may be added together with the catalyst to form the polyurethane elastomer. Alternatively, the reaction may be suspended after it's initiated by freezing the reactants at a temperature of the order of 40° below zero Fahrenheit and the reaction completed at a later date by placing the frozen reactants, for example in an appropriately heated tool to make a part. Once all the reactants have been added together and the polymerization reaction has been initiated the forming polyurethane may be shaped according to any of the conventional techniques including injection molding, spin casting, flow coating, compression molding, mold casting, etc. Following shaping the polyurethane elastomer may be cured at elevated temperature from about 200 to 250 degrees Fahrenheit for approximately 1 to 2 hours followed by a postcure at the same temperature for up to 16 hours and a preconditioning at room temperature for about two weeks. While the asymmetric ionic quarternary ammonium salt may be added with the other reactive ingredients to the reactor vessel, it is preferred to first add it to the mixture of the cross linking agents and chain extenders then heating to dissolve the additive followed by filtering to remove impurities, degassing at about 176° F. and then adding to the prepolymer. Typically, the additive is present in amount of about 0.5 parts to 8 parts by weight per 100 parts of the total composition.

In fabricating a bias transfer member, typically a roll, a conductive substrate such as aluminum is first grit blasted and then cleaned with trichloromethane. While not absolutely necessary, it is preferred to prime the aluminum substrate with a primer such as Chemlock 213, a blend of aromatic and aliphatic hydrocarbon solvents and fillers, mixed with a thinner such as Chemlock 248, a blend of methyl ethyl ketone, xylene, propylene glycol, methyl ether acetate and dipropylene glycol methyl ether, both available from Lord Elastomer Products, Erie, Pa. in a volume ratio of about 1 to 10 of primer to thinner to provide a thin coating that does not effect the resistivity of the polyurethane elastomer.

The higher molecular weight glycols form relatively soft elastomers having a Shore A hardness of 60 durometer and in which it is possible to incorporate substantial quantities of the conductive additive to obtain elastomers having very low resistivities which may be desirable in certain applications. Furthermore, the higher molecular weight, polytetramethylene ethyl glycols are much more difficult to clean as transfer members of machine debris, including toner than the much lower molecular weight glycols. For example, it takes more than four times as much air velocity (416 versus 96 feet/second) to blow debris off an elastomer surface made with a polytetramethylene ether glycol having a molecular weight of about 2900 than one having a molecular weight of only about 650. Accordingly, the best properties of both the high molecular weight and low molecular weight glycols may be had by providing a relatively thick (0.250 inches) layer of the high molecular weight material on the roll surface in which the resistivity can be controlled at low levels and spray coated with a thin over coat of the relatively low molecular weight materials to a thickness of from about seven-tenths of a mil. to one and one-half mils. and nominally one mil.

The following specific examples illustrate more clearly the electrically conductive polyurethane elastomers according to the present invention. In the Examples, all parts and percentages are by weight unless otherwise stated.

EXAMPLE I

Sample rolls were fabricated from a polyether polyurethane material that was comprised of components A and B. Component A consisted of 100 parts by weight of Terathane TM 2900, 0.8 parts by weight of Catafor CA-100 which is a hexadecyl ethyl dimethyl ammonium ethyl sulfate available from Aceto Chemical Company in Flushing, N.Y.; 5.8 parts by weight of a mixture of 60% butanediol and 40% trimethylol propane and 4 to 8 drops of dibutyl tin dilaurate catalyst in a one percent solution of butanediol to control the reaction rate. Component A was fabricated by preheating the butanediol trimethylol propane mixture and the Catafor to 80° C. and also preheating the Terathane 2900 to 80° C. Component B was comprised of 24 parts by weight of methylene diisocyanate preheated to 40° C. Components A and B were separately degassed for 30 minutes at 80° C. after which component B was poured into component A with mixing and the mixture degassed for an additional minute. The material was then poured into a preheated mold and cured for 2 hours at 300° F. After the curing, the mold was water quenched for 30 minutes and the molded part removed from the mold. The roll was then permitted to dwell at room temperature from 3 to 24 hours and postcured at 300° F. for 16 hours. The fabricated rolls were then permitted to dwell for 16 days at room temperature to stabilize the crosslinking and were then ground using a South Bend grinder to a diameter of 1.5 inches. The fabricated rolls were then tested for resistivity and electrical life and compared to the bias transfer roll described in the above mentioned patents made from a polyester polyurethane with a tetraheptyl ammonium bromide conductive additive with the following results:

| Property | Example I | Prior Art BTR |
| --- | --- | --- |
| Resistivity (ohm-cm) | $2.62 \times 10^9$ | $3 \times 10^9$ |
| Electrical Life at 75 ua | 900 hours | 100 hours |

The electrical life test was conducted on a fixture with the roll cycling against the photoreceptor with the electrical life being determined by the increased resistivity of the roller as a function of time. When the power supply voltage limit is reached the electrical life of the roll has failed. The resistivity was tested with conventional equipment. The above results indicate that the roll prepared according to the present invention obtained the required resistivity but yielded an electrical life improvement of 9 fold over the prior art.

The roll of Example I was tested in a Xerox 5090 duplicator for photoreceptor and toner compatibility and transfer function and determined to have good transfer efficiency. It did not damage the photoreceptor even at the higher hardness level and was compatible with various toners in initial testing.

EXAMPLE II

A bias transfer roll was prepared in the same manner as in Example I, except that it was finally ground to provide an outside diameter of 1.499 inches and was overcoated with a thin layer of a polyurethane elastomer obtained by the reaction of a lower molecular weight polytetramethylene ethyl glycol DuPont Terathane 650 in the following manner: A spray mix was prepared by adding 92.3 grams of 4,4 diphenyl methane diisocyanate to 16.5 grams of the Terathane 650 as homogeneous liquids. Since the reaction is exothermic it takes place over a period of 15 to 20 minutes while stirring, after which it is permitted to stand for 2 hours followed by degassing. This is mix A:

Separately, 4.3 grams of hexadecyl ethyl dimethyl ammonium ethyl sulfate, Catafor CA-100 were added to 20.9 parts of butanediol and stirred to assure complete dispersion, after which the mixture was placed in an oven at 140° F. until the liquid became clear. To this solution was added 83.5 grams of melted Terathane 650 which was thoroughly mixed and degassed. This is mix B:

The spray formulation was prepared by adding 10 grams of methyl ethyl ketone and 10 grams of ethyl acetate to mix A and separately adding 10 grams of methyl ethyl ketone and 10 grams of ethyl acetate to 30 grams of mix B, followed by the addition of 0.4 grams of a fluorosurfactant, FC-430 available from 3M Company. The mix A portion was maintained at 105° F. followed by adding mix A to mix B and vigorously blending for 30 seconds to form the spray mix. The roll previously prepared was placed in a fixture and rotated at 45 rpm and the spray mix is sprayed onto the rotating surface of the roll in 30 to 50 passes to provide an ultimate coating of the lower molecular weight polyurethane of 0.001 inches. The coated roll was subjected to a postcure for 16 hours at 230° F. and is believed to have an electrical life equivalent to the roll of Example I.

Thus, according to the present invention an electrically conductive polyurethane elastomer having a dramatically increased electrical life is provided. Further, this elastomer is environmentally stable to changes in relative humidity and temperature, relatively inexpensive and compatible with the multilayered electroconductive photoreceptors described in U.S. Pat. No. 4,265,990.

The patents and copending patent application referred to herein are hereby specifically, totally and completely incorporated herein by reference.

While the present invention has been described with reference to specific embodiments described herein it will be apparent that many alternatives, modifications and variations may be made by those skilled in the art. Accordingly, it is intended to embrace all such alternatives and modifications as may fall within the spirit and scope of the appended claims.

We claim:

1. An electrically conductive polyurethane elastomer obtained by the reaction of a polytetramethylene ether glycol having the formula $HO[(CH_2)_4O]_xH$ where x is from 8 to 41 and from about 20 to about 95 parts by weight per 100 parts by weight of said glycol of at least one diisocyanate, a sufficient amount of cross linking agents and chain extenders to provide a crosslinked elastomer and an amount of an asymmetric ionic quarternary ammonium salt having the formula:

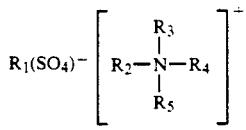

where $R_1$, $R_2$, $R_3$, $R_4$ and $R_5$ are $C_nH_{2n+1}$ and $1 \leq n \leq 25$ sufficient to provide a D.C. volume resistivity of from about $10^7$ to about $10^{11}$ ohm cm.

2. The elastomer of claim 1 wherein said asymmetric ionic quarternary ammonium salt is selected from the group consisting of Hexadecyl ethyl dimethyl ammonium ethyl sulfate; 1-Octadecanaminium, N,N,N-trimethyl-,methyl sulfate; 1-Dodecanaminium, N,N,N-trimethyl-, methyl sulfate; 1-Heptadecanaminium, N,N,N,trimethyl-, methyl sulfate; 1-Tetradecanaminium, N,N,N-trimethyl-, methyl sulfate; and 1-Decanaminium, N,N,N-trimethyl-, methyl sulfate.

3. The elastomer of claim 2 wherein said asymmetric ionic quarternary ammonium salt is hexadecyl ethyl dimethyl ammonium ethyl sulfate.

4. The elastomer of claim 1 wherein said diisocyanate is selected from the group consisting of methylene diisocyanates, diphenylmethane diisocyanates, toluene diisocyanates, naphthalene diisocyanates and blends thereof.

5. The elastomer of claim 1 wherein said chain extender and cross linking agent comprise a mixture of from about 90 to 60% by weight of a diol having the formula $HO(R_6)OH$ where $R_6$ is a straight or branched chain alkyl group having from 2 to 12 carbon atoms and from about 10 to 40% of a triol having the formula: $R'-C-[(OH)_a(CH_2OH)_b]$ where $R'$ is H, $CH_3$ or $C_2H_5$, a is 0 or 1, b is 2 or 3 and $a+b=3$.

6. The elastomer of claim 4 wherein said chain extenders and cross linking agent comprise a mixture of from about 90 to 60% by weight of a diol having the formula $HO(R_6)OH$ where $R_6$ is a straight or branched chain alkyl group having from 2 to 12 carbon atoms and from about 10 to 40% of a triol having the formula: $R'-C-[(OH)_a(CH_2OH)_b]$ where $R'$ is H, $CH_3$ or $C_2H_5$, a is 0 or 1, b is 2 or 3 and $a+b=3$.

7. The elastomer of claim 1 wherein said quarternary ammonium salt is present in an amount of from about 0.5 parts to 8 parts by weight of the total composition.

8. The polyurethane of claim 1 wherein the elastomer is prepared by adding all the recited reactive constituents and cross linking agents and extenders to a reaction vessel at the same time.

9. The polyurethane of claim 5 wherein the elastomer is prepared by first forming a prepolymer of the polytetramethylene ether glycol and the diisocyanate followed by the addition of the cross linking agent and the extender to the prepolymer.

10. The polyurethane of claim 1 wherein the total weight of cross linking agents and extenders is from about 4 to about 18 parts per 100 parts of polytetramethylene ether glycol.

11. The polyurethane of claim 5 wherein the elastomer is formed from a mixture of a chain extender and a cross linking agent comprising about 75% by weight of 1,4 butanediol and 25% by weight trimethylolpropane.

12. The polyurethane of claim 5 wherein the elastomer is formed from a mixture of a chain extender and a cross linking agent comprising about 60% by weight 1,4 butanediol and 40% by weight trimethylolpropane.

13. The polyurethane of claim 1 wherein x is from 39 to 41.

14. The polyurethane of claim 1 wherein said diisocyanate is present in an amount from about 22 to 26 parts by weight per 100 parts by weight of said glycol.

15. The elastomer of claim 9 wherein said quarternary ammonium salt is initially combined with the chain extenders and cross linking agents and subsequently added to the prepolymer.

* * * * *